Jan. 30, 1973 E. S. WRIGHT 3,713,855
PRODUCTION OF BASIC REFRACTORIES
Filed March 24, 1971
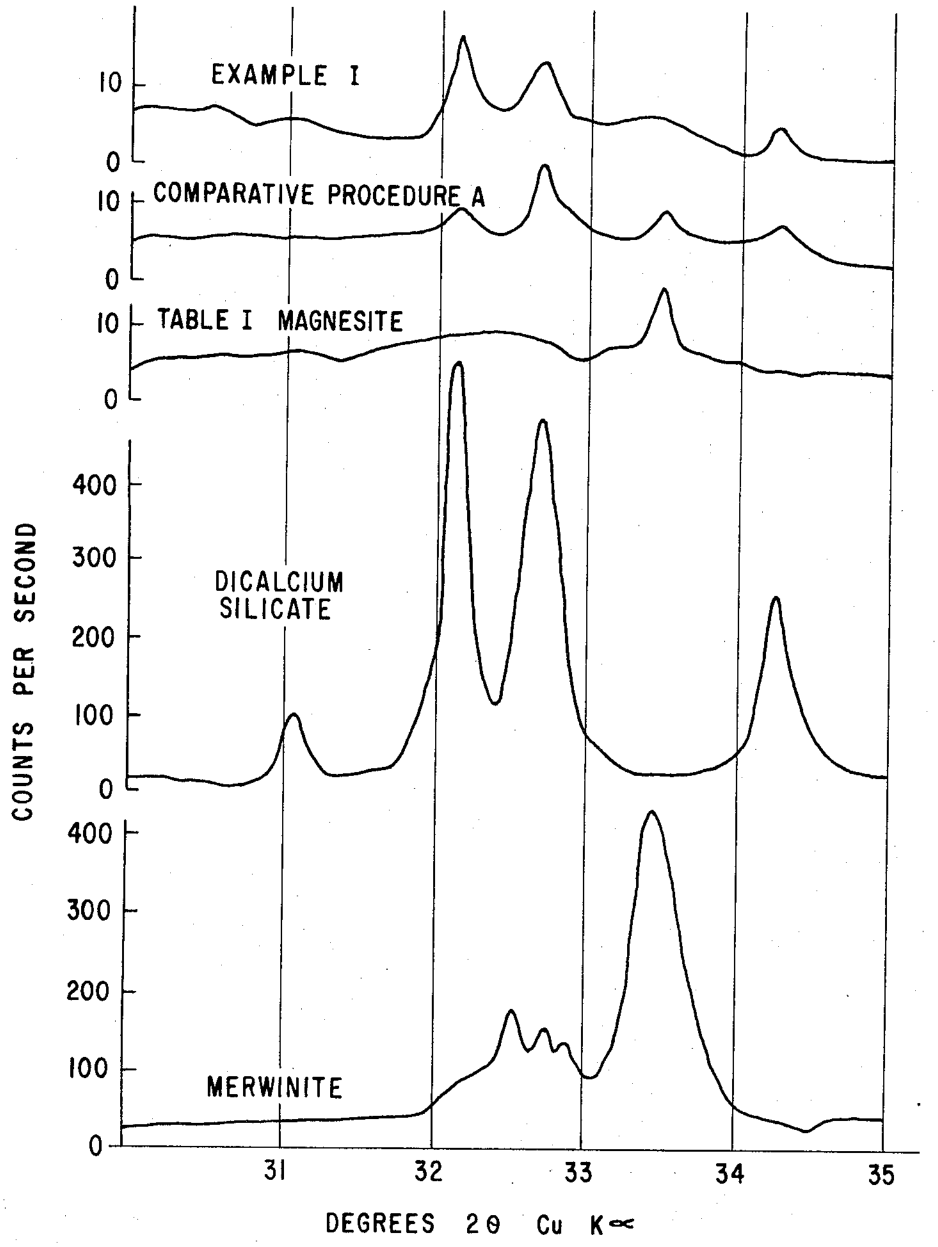
INVENTOR.
EDMUND S. WRIGHT
BY
[signature]
ATTORNEY United States Patent Office 3,713,855
Patented Jan. 30, 1973

1

3,713,855

PRODUCTION OF BASIC REFRACTORIES

Edmund S. Wright, Clearfield, Pa., assignor to Eltra Corporation, Toledo, Ohio

Filed Mar. 24, 1971, Ser. No. 127,665
Int. Cl. C04b *35/04*
U.S. Cl. 106—58 8 Claims

ABSTRACT OF THE DISCLOSURE

An improved method for producing a high MgO refractory, having lime and silica as the major impurities is disclosed. The method involves preparing a batch of size-graded periclase particles, tempering the batch, forming the tempered batch into a shape, drying the shape and firing the shape. According to the invention, at least 0.1 percent by weight of a calcium compound, calculated as CaO and based on the dry weight of the batch, is dissolved in the tempering liquid, the weight ratio of lime to silica is controlled to one from 1.5:1 to 2.6:1, and firing is controlled so that the overall refractoriness of the accessory phases is increased. Preferably, the $CaO/SiO_2$ ratio and firing are controlled so that dicalcium silicate is formed as the principal accessory phase. The addition of silica, in addition to the dissolved calcium compound, to control the $CaO/SiO_2$ ratio is also disclosed.

BACKGROUND OF THE INVENTION

This invention relates to a method for producing a refractory product having a high MgO content.

With ever increasing refinement of technique in the basic oxygen steel-making processes, the demands by the steel producers for increased furnace life have required continued improvement in those refractories comprising the working or inner lining. Because the basic oxygen process operates with basic slags, the working lining has been constructed of basic refractories, usually tar-bonded, chemically bonded, or burned, the latter usually being tar or pitch impregnated. Such refractories, which have been most effectively produced from magnesite, natural or synthetic, must withstand slag erosion and penetration, thermal shock, abrasion, mechanical stress, and severe impact.

Generally, burned, pitch-impregnated magnesite brick have been used in the high wear areas in basic oxygen furnaces, especially where impact and/or stress concentrations occur.

It has been known from Seaton, U.S. 2,238,428, issued Apr. 15, 1941, that dense, refractory articles of good mechanical strength at high temperatures can be made consisting of substantially pure, granular magnesia in periclase form, held in a matrix or binder of lime and silica combined as dicalcium silicate. Seaton teaches that either silica or lime may be added to adjust the ratio, it being convenient to add all or some of the CaO as hydrated lime.

Schoenlaug, U.S. 2,364,002, issued Nov. 28, 1944, also teaches the advantages of maintaining the $CaO/SiO_2$ ratio so as to form dicalcium silicate and suggests the use of fluorspar as an improvement over the addition of calcium oxide or a simple compound of calcium oxide to avoid prior art difficulties caused by the evolution of disruptive gases in the burning process, or introduction of materials deleterious to refractoriness. The use of $CaCl_2$ to form the bond in a chemically bonded brick which is not fired before installation is also suggested, but there is no indication that this use of $CaCl_2$ influences the accessory phases.

2

Davies et al., U.S. 3,141,790, issued July 21, 1964, teaches that the loss of hot strength in high MgO refractories is caused by the weakening of the magnesite or periclase crystal-to-periclase crystal bonding by an intervening film of silicate. The $CaO/SiO_2$ ratio is maintained between 3:1 and 4:1 to insure the principal non-magnesia crystalline ingredient to be tricalcium silicate. The $CaO/SiO_2$ ratio is adjusted by adding technical grade lime hydrate to the MgO.

Both Van Dreser, U.S. 3,378,383, issued Apr. 16, 1968, and Mayberry, U.S. 3,473,939, issued Oct. 21, 1969, teach the importance of maintaining a $CaO/SiO_2$ ratio of at least 1.86:1, that is, in at least a dicalcium silicate ratio, so as to produce a high MgO refractory wherein the dicalcium silicate is present in discrete, discontinuous zones. This produces a refractory wherein a major proportion of the periclase particles are directly bonded to other periclase particles, generally free of silicate film.

Thus it has been established in the art that magnesite brick of at least 85 percent MgO and preferably 94 percent MgO and higher, having CaO and $SiO_2$ as their major impurities will exhibit increased hot strength, both compressive and tensile, if the ratio of CaO to $SiO_2$ is controlled so that the silicate is essentially dicalcium or tricalcium silicate and if the total $(Al_2O_3+Fe_2O_3+Cr_2O_3)$ content is less than about 3 percent on a weight basis. The art also teaches that the $CaO/SiO_2$ ratio may be altered by the addition of any material which yields CaO upon firing, for example $Ca(OH)_2$, $CaCO_3$, and the like, or by the addition of $SiO_2$, as for example, volatilized silica or diatomaceous earth.

Although brick made according to these criteria have performed well in the basic oxygen furnace and other applications, the high-temperature tensile strength has been low in comparison to the high-temperature compressive strength. To improve resistance to mechanical and thermal stress, it is therefore necessary to increase the tensile strength at high temperature or to increase both the tensile and compressive strength a high temperature, the primary concern being increased high temperature tensile strength.

SUMMARY OF THE INVENTION

The present invention is directed to an improvement in a method for the production of high MgO refractory brick. The method involves, in general, preparing a batch of size-graded periclase particles, tempering the batch, forming the tempered batch into a shape, drying the shape and firing the shape. According to the invention, at least 0.1 percent[1] of a calcium compound, calculated as CaO and based on the dry weight of the batch, is dissolved in the tempering liquid, the weight ratio of lime to silica is controlled to one from 1.5:1 to 2.6:1, and firing is controlled so that the overall refractoriness of the accessory phases is increased. Preferably the $CaO/SiO_2$ ratio and firing are controlled so that dicalcium silicate is formed as the principal accessory phase. The addition of silica, in addition to the dissolved calcium compound, can also be used to control the $CaO/SiO_2$ ratio

REFERENCE TO DRAWING

The accompanying drawing is a composite of a plurality of X-ray diffractogram representations, and illustrates one of the analytical procedures that was used in evaluating the method of the instant invention, as well as the advantage that is realized.

Accordingly it is an object of this invention to provide an improved method of forming ceramically bonded

[1] The terms "percent" and "parts" are used herein, and in the appended claims, to refer to percent and parts by weight, unless otherwise indicated.

shapes having an improved hot tensile strength, being particularly suited for, but not restricted to, the lining of basic oxygen furnaces.

It is a further object of this invention to provide an improved method of forming a green, unfired refractory shape that is higher in green density than those made according to conventional practice.

It is still a further object of this invention to provide an improved method of synthetically adjusting the $CaO/SiO_2$ ratio of high MgO refractory brick to form essentially dicalcium silicate as the silicate impurity.

Further objects and advantages of the invention will become apparent from the following description and examples.

The instant invention will be more fully understood from the following examples, which describe preferred specific embodiments. In the examples, as elsewhere herein, all sizing is reported as standard mesh per linear inch, Tyler screen series.

Example I

A refractory batch having the following composition was prepared in a muller-type mixer by dry-mixing magnesite, silica [2] and lignin sulfonate and tempering the dry mix with a solution of $Ca(NO_3)_2$:

| | Percent |
|---|---|
| Magnesite | 95.1 |
| Silica | 0.3 |
| Lignin sulfonate | 1.0 |
| $Ca(NO_3)_2$ (added as a 50% aqueous solution) | 3.6 |

The dead burned, natural magnesite used had the following composition: [3]

TABLE I

| | Percent |
|---|---|
| $SiO_2$ | 1.51 |
| CaO | 2.99 |
| $Al_2O_3$ | 0.07 |
| $Fe_2O_3$ | 0.50 |
| $Cr_2O_3$ | 0.03 |
| $B_2O_3$ | 0.012 |
| MgO (by difference) | 94.88 |

The sizing of the magnesite grain was as follows:

| | Percent |
|---|---|
| −3 +6 mesh | 27 |
| −6 +14 mesh | 20 |
| −14 +48 mesh | 15 |
| −48 mesh | 7 |
| −100 mesh | 31 |

The batch ingredients were then formed into bricks in a dry press under a pressure of approximately 14,000 pounds per square inch, cured at about 400° [4] for about 12 hours, and burned at about 2900° with a soak time of approximately 5 hours.

The above described bricks were tested for green bulk density before curing; and after burning they were tested for bulk density, apparent porosity, modulus of rupture at room temperature, at 2700°, and at 2900°, and hot crushing at 2800°. All physical test results contained herein represent an average of at least 4 samples. Test results for the brick of Example I are tabulated in Table II:

[2] The silica used in this and subsequent examples was volatilized silica from the ferro-silicon process, approximately 96 percent $SiO_2$, and was sub-micron in particle size.

[3] All chemical analyses contained herein and in the appended claims were obtained by X-ray emission spectrographic procedures standardized by wet chemical analyses, except $B_2O_3$ was determined by wet chemical analysis.

[4] All temperatures herein and in the appended claims are expressed in degrees Fahrenheit.

TABLE II

| | |
|---|---|
| Predominant accessory phases [1] | Dicalcium silicate. |
| Relative proportions: | |
| CaO | 3.56. |
| $SiO_2$ | 1.75. |
| $CaO/SiO_2$ | 2.03. |
| Green: Bulk density (p.c.f) | 191.9. |
| Burned: Bulk density (p.c.f.) | 187.0. |
| Apparent porosity (percent) | 15.10. |
| Modulus of rupture (p.s.i.): | |
| Room temperature | 2017. |
| 2700° | 2176. |
| 2900° | 1605. |
| Hot crushing (p.s.i.): 2800° | 3340. |

[1] All mineral phase determinations were made by X-ray diffraction, and qualitative results are based on a comparison with diffractograms of individual minerals.

Both green and burned bulk density were determined by ASTM [5] method C134–41. The apparent porosity was determined by ASTM method C20–46. The modulus of rupture at room temperature was determined by ASTM method C133–55. The modulus of rupture at 2700° and at 2900° was determined by ASTM method C133–55 except that test specimens 1″ x 1″ x 7″ in size were cut from full size bricks. A constant loading rate of 150 pounds per minute was used for all modulus of rupture tests. The hot crushing strength at 2800° was determined in a manner similar to ASTM method C133–55 for cold crushing strength, using cylindrical test specimens 1.1″ in diameter and 2″ in height cut from full size bricks. A constant loading rate of 300 pounds per minute was used for all hot crushing strength tests. All high temperature tests were carried out in an electrically heated furnace.

Comparative Procedure A

For purposes of comparison, but not in accordance with the invention, refractory brick were prepared and fired by the same procedure detailed in Example I, except that the $CaO/SiO_2$ ratio was not adjusted by the addition of a soluble calcium compound or silica. The magnesite used had the same chemical composition and sizing shown in Table I:

| | Percent |
|---|---|
| Magnesite | 96.2 |
| Lignin sulfonate | 1.0 |
| $MgSO_4$ (added as a 22% aqueous solution) | 2.8 |

Test results for the brick of Procedure A are tabulated in Table III:

TABLE III

| | |
|---|---|
| Predominant accessory phases | Dicalcium silicate and merwinite. |
| Relative proportions: | |
| CaO | 2.99. |
| $SiO_2$ | 1.51. |
| $CaO/SiO_2$ | 1.98. |
| Green: Bulk density (p.c.f.) | 188.1. |
| Burned: Bulk density (p.c.f.) | 184.0. |
| Apparent porosity (percent) | 16.10. |
| Modulus of rupture (p.s.i.): | |
| Room temperature | 1459. |
| 2700° | 1304. |
| 2900° | 806. |
| Hot crushing (p.s.i.): 2800° | 1678. |

[5] All ASTM test results contained herein were obtained according to the Manual of ASTM Standards on Refractory Materials (1963).

A comparison of the test results of Example I, for brick made according to the invention, with those set forth above for brick made according to the teachings of the prior art, demonstrates that a slight increase in the amount of dicalcium silicate from the conversion of merwinite by controlling the adjustment of the $CaO/SiO_2$ ratio by the addition of a soluble calcium compound produces a large increase in the hot tensile strength of the burned magnesite brick at 2700°, and an increase of almost 100 percent in the hot tensile strength at 2900°. A further comparison shows an increase of almost 100 percent over the prior art sample in hot crushing strength at 2800°, a substantial increase in room temperature modulus of rupture and bulk density, and a significant decrease in apparent porosity. The increase in the relative green bulk density figure in Example I is believed to indicate that the solution of the soluble calcium compound acts as a pressing aid when the solution is used as the tempering fluid.

The effecting of practicing the invention on brick made from the above defined grain is thoroughly illustrated by the X-ray diffractogram representations presented in FIG. 1. Diffraction pattern representations of individual standards of dicalcium silicate and merwinite are included to facilitate interpretation of the phases present in the refractory samples. The range of 30 to 35 degrees $2\theta$ was selected because there is no interference between the merwinite peak at 33.4 degrees $2\theta$ and any of the dicalcium silicate peaks.

The diffractogram representations show that the dead-burned, natural magnesite in the as-received form having the composition shown in Table I, contains fairly well developed merwinite and that the dicalcium silicate content in comparison is relatively low and not well crystallized. Brick made from this material according to the prior art as illustrated by the foregoing comparative procedure show an increase in the amount of dicalcium silicate present as the primary accessory phase at the expense of the merwinite content. Some merwinite is still present, however.

Brick made according to this invention as illustrated by Example I show a more complete development of dicalcium silicate at the expense of merwinite. The diffractogram representation indicates that there is little or no merwinite remaining and that the quantity of dicalcium silicate is slightly increased.

It is not completely understood why CaO-yielding solutions formed from soluble calcium compounds are so effective in adjusting the silicate phase. It is believed that the most homogeneous attainable distribution of the calcium compounds is achieved during their deposition as the solvent is driven off in curing. During burning of the refractory these compounds are believed to decompose into a gas plus CaO which because of its origin is very reactive and, when the lime to silica ratio is appropriate, readily combines with the silicates present in the refractory particles and/or any silica additions. Because of its placement and reactivity, it reacts readily to form the desirable dicalcium silicate, which significantly increases the hot tensile strength of the refractory.

Of the water soluble calcium compounds, calcium nitrate has been found to be the most effective. It can be readily obtained from commercial sources in sufficient purity, preferably at least 80 percent $Ca(NO_3)_2$. Its solubility at room temperature allows the use of solutions of up to approximately 55 percent concentration, higher concentrations being attainable by heating. Another advantage of solutions formed from calcium nitrate is that they are most effective as pressing aids, making possible the attainment of higher green density in pressed brick or other refractory shapes than has previously been possible through most conventional production techniques. This gain in green density is in turn responsible for higher chemically-bonded and burned densities.

The required solution in the refractory mix of a soluble calcium compound in a suitable solvent can be formed in various ways. The soluble calcium compound can be dry mixed into the refractory grain so that when a solvent therefor is added to temper the admixture, the solution of the soluble calcium compound is formed during mixing. It is also possible to coat or saturate one or more constituents of the batch with a solution of a soluble calcium compound, dry these treated constituents, include them in the admixture, and by tempering the admixture with a solvent for the calcium compound form the required solution during mixing. The preferred method of the invention is to use the premixed solution of the soluble calcium compound to temper the admixture, prior to forming the admixture into a brick or other shape. Since a tempering liquid must be added to the refractory mix to enable pressing a refractory shape therefrom, the calcium compound is ultimately dissolved in the tempering liquid by all of the procedures described in this paragraph. The preferred method of using a solution of the soluble calcium compound as the tempering liquid is the most effective production method for practicing the invention.

Example II

A refractory batch having the following composition was prepared as described in Example I:

| | Percent |
|---|---|
| Magnesite | 95.00 |
| Silica | 0.40 |
| Lignin sulfonate | 1.0 |
| $Ca(NO_3)_2$ (added as a 50 percent aqueous solution) | 3.60 |

The dead burned, natural magnesite used had the following composition:

TABLE IV

| | Percent |
|---|---|
| $SiO_2$ | 1.12 |
| CaO | 2.98 |
| $Al_2O_3$ | 0.26 |
| $Fe_2O_3$ | 0.70 |
| $Cr_2O_3$ | 0.02 |
| $B_2O_3$ | 0.02 |
| MgO (by difference) | 94.89 |

The sizing of the magnesite grain was as follows:

| | |
|---|---|
| −3 +6 mesh | 20 |
| −6 +14 mesh | 25 |
| −14 +48 mesh | 17 |
| −48 mesh | 6 |
| −100 mesh | 32 |

The batch ingredients were then formed into bricks in the manner described in Example I, except that the firing was to about 2900° for approximately 8 hours, and the bricks were tested, with the following results:

TABLE V

| | |
|---|---|
| Predominant accessory phases | Dicalcium silicate. |
| Relative proportions: | |
| CaO | 3.73. |
| $SiO_2$ | 1.54. |
| $CaO/SiO_2$ | 2.42. |
| Green: Bulk density (p.c.f.) | 188.4. |
| Burned: Bulk density (p.c.f.) | 185.3. |
| Apparent porosity (percent) | 15.08. |
| Hot crushing (p.s.i.): | |
| Room temperature [1] | 4820. |
| 2700° | 998. |
| 2900° | N.D.[2] |
| Modulus of rupture (p.s.i.): 2800° | 2081. |

[1] Determined on pitch impregnated samples.
[2] Not determined.

Comparative Procedure B

For purposes of comparison, but not in accordance with the invention, refractory brick were prepared and fired by the same procedure detailed in Example II, except that neither a soluble calcium compound nor $SiO_2$ was added to the mix. The magnesite used had the same chemical composition and sizing as shown in Table IV.

The following mix was used:

| | Percent |
|---|---|
| Magnesite | 96.25 |
| Lignin sulfonate | 1.0 |
| $MgSO_4$ (added as a 22% aqueous solution) | 2.75 |

The batch ingredients were then formed into bricks in the manner described in Example II and the bricks were tested with the following results:

TABLE VI

| | |
|---|---|
| Predominant accessory phases | Dicalcium silicate. |
| Relative proportions: | |
| CaO | 2.98. |
| $SiO_2$ | 1.12. |
| $CaO/SiO_2$ | 2.56. |
| Green: Bulk density (p.c.f.) | 183.6. |
| Burned: Bulk density (p.c.f.) | 180.3. |
| Apparent porosity (percent) | 17.36. |
| Modulus of rupture (p.s.i.): | |
| Room temperature [1] | 4253. |
| 2700° | 406. |
| 2900° | N.D. |
| Hot crushing (p.s.i.): 2800° | 1039. |

[1] Determined on pitch impregnated samples.

A comparison of the test results from Example II and Comparative Procedure B demonstrates that the addition of a soluble calcium compound produces an increase of greater than 100 percent in both hot modulus of rupture at 2700° and hot crushing at 2800°. The increase in the relative green bulk density is believed to show that the soluble calcium compound acts as a pressing aid when the solution is used as a tempering fluid.

X-ray diffraction analyses show only a slight increase in the amount of dicalcium silicate present in Example II over that in Comparative Procedure B. Calculation of the mineral phases present, based on the chemical analyses according to the method described by Rigby, Richardson and Ball [6] supports this finding. The calculations imply the presence of brownmillerite in both Example II and Comparative Procedure B. Since the presence of dicalcium silicate interferes with accurate determinations of brownmillerite by X-ray diffraction, it is difficult to determine exact levels of brownmillerite, especially when the quantities are small. It is believed, however, that the improved properties shown for Example II are realized because the brownmillerite content is held essentially constant while the dicalcium silicate content is slightly increased.

Example III

A refractory batch having the following composition was prepared as described in Example I:

| | Percent |
|---|---|
| Magnesite | 95.3 |
| Silica | 0.3 |
| Lignin sulfonate | 1.0 |
| $Ca(NO_3)_2$ (added as a 45 percent aqueous solution) | 3.4 |

[6] G. R. Rigby, H. F. Richardson and F. Ball, "The Mineralogical Composition of Magnesite Bricks," Transactions of The British Ceramic Society, 46, 313–29, 1947.

The dead burned, natural magnesite used had the following composition:

TABLE VII

| | Percent |
|---|---|
| $SiO_2$ | 1.51 |
| CaO | 2.76 |
| $Al_2O_3$ | 0.07 |
| $Fe_2O_3$ | 0.51 |
| $B_2O_3$ | 0.012 |
| $Cr_2O_3$ | 0.03 |
| MgO (by difference) | 95.11 |

The sizing of the magnesite grain was as follows:

| | Percent |
|---|---|
| −3 +6 mesh | 25 |
| −6 +14 mesh | 22 |
| −14 +48 mesh | 15 |
| −48 mesh | 7 |
| −100 mesh | 31 |

The batch ingredients were then formed into bricks in the manner described in Example I, and the bricks were tested with the following results:

TABLE VIII

| | |
|---|---|
| Predominant accessory phases | (1). |
| Relative proportions: | |
| CaO | 3.45. |
| $SiO_2$ | 1.76. |
| $CaO/SiO_2$ | 1.96. |
| Green: Bulk density (p.c.f.) | 191.6. |
| Burned: Bulk density (p.c.f.) | 187.7. |
| Apparent porosity (percent) | 15.62. |
| Modulus of rupture (p.s.i.): | |
| Room temperature | 2542. |
| 2700° | 2335. |
| 2900° | N.D. |
| Hot crushing (p.s.i.): 2800° | 3698.[2] |

[1] Dicalcium silicate and a trace of merwinite.
[2] Indicates that one or more of the test specimens in the group exceeded the limit of the testing equipment.

Example IV

Refractory bricks were prepared from magnesite having the same chemical composition and sizing shown in Table VII. The $CaO/SiO_2$ ratio was adjusted by the addition of a solution of $CaCl_2$:

| | Percent |
|---|---|
| Magnesite | 94.9 |
| Silica | 0.50 |
| Lignin sulfonate | 1.0 |
| $CaCl_1$ (added as a 50 percent aqueous solution) | 3.6 |

The following test results were obtained on brick produced from this batch as described in Example I:

| | |
|---|---|
| Predominant accessory phases | (1). |
| Relative proportions: | |
| CaO | 3.63. |
| $SiO_2$ | 1.90. |
| $CaO/SiO_2$ | 1.90. |
| Green: Bulk density (p.c.f.) | 190.1. |
| Burned: Bulk density (p.c.f.) | 184.1. |
| Apparent porosity (percent) | 17.06. |
| Modulus of rupture (p.s.i.): | |
| Room temperature | 2011. |
| 2700° | 1863. |
| 2900° | N.D. |
| Hot crushing (p.s.i.): 2800° | 3424.[2] |

[1] Dicalcium silicate and a trace of merwinite.
[2] Same as above, Table VIII.

Example V

Refractory bricks were prepared and fired by the same procedure detailed in Example III. The magnesite used had the same chemical composition and sizing as shown in Table VII. The following batch was used:

| | Percent |
|---|---|
| Magnesite | 95.44 |
| Silica | 0.36 |
| Lignin sulfonate | 1.0 |
| $CaCl_2$ (added as a 40 percent aqueous solution) | 3.2 |

The following test results were obtained:

TABLE IX

| | Dicalcium silicate and a trace of merwinite. |
|---|---|
| Relative proportion: | |
| CaO | 3.43. |
| $SiO_2$ | 1.80. |
| $CaO/SiO_2$ | 1.91. |
| Green: Bulk density (p.c.f.) | 191.5. |
| Burned: Bulk density (p.c.f.) | 185.7. |
| Apparent porosity (percent) | 16.35. |
| Modulus of rupture (p.s.i.): | |
| Room temperature | 2492. |
| 2700° | 1728. |
| 2900° | N.D. |
| Hot crushing (p.s.i.): 2800° | 3482.[1] |

[1] Same as above, Table VIII.

A comparison of test results obtained from Examples III, IV and V, in which the $CaO/SiO_2$ proportions were adjusted to approximately the same ratio by the addition of a soluble calcium compound, shows that the use of $Ca(NO_3)_2$ to adjust the ratio produces a greater increase in hot modulus of rupture strength than the use of $CaCl_2$. The use of $CaCl_2$ as a tempering fluid increased the green density, the increases being substantially comparable to that produced by the use of $Ca(NO_3)_2$, but $Ca(NO_3)_2$ gave higher fired densities.

The examples demonstrate that the improved method of synthetically adjusting the $CaO/SiO_2$ ratio of a high MgO refractory by the addition of a calcium compound dissolved in a tempering liquid, produces a great improvement in both compressive and tensile hot strength. The calcium compound also acts as a pressing aid when the solution is used as a tempering fluid. It has not been found to be possible to achieve such results by adding an insoluble calcium compound, e.g., lime hydrate, to the batch. For example, three brick batches were prepared, and shapes were pressed, cured and fired as described in Example I. The batches are identified in the following table, in percent:

| | Comparative procedure | | |
|---|---|---|---|
| | C | D | E |
| Magnesite [1] | 96.2 | 94.05 | 93.80 |
| Lignin sulfonate | 1.0 | 1.0 | 1.0 |
| $MgSO_4$ (added as a 22% aqueous solution) | 2.8 | 3.9 | 4.1 |
| $Ca(OH)_2$ (hydrated lime) | | 0.75 | 0.80 |
| Silica | | 0.3 | 0.3 |

[1] Dead burned, natural material.

The magnesite used in Comparative Procedures C, D and E had the following composition and particle sizing:

| | Percent |
|---|---|
| $SiO_2$ | 1.66 |
| CaO | 2.95 |
| $Al_2O_3$ | 0.09 |
| $Fe_2O_3$ | 0.63 |
| $Cr_2O_3$ | 0.03 |
| $B_2O_3$ | 0.01 |
| MgO (by difference) | 94.63 |
| −3 +6 mesh | 26 |
| −6 +14 mesh | 24 |
| −14 +48 mesh | 15 |
| −48 +100 mesh | 5 |
| −100 mesh | 30 |

The brick produced by Comparative Procedures C, D and E had the following properties:

| | Comparative procedure | | |
|---|---|---|---|
| | C | D | E |
| Predominant accessory phases | Dicalcium silicate and merwinite | Dicalcium silicate and merwinite | Dicalcium silicate and merwinite |
| $CaO/SiO_2$ | 1.78 | 1.86 | 1.92 |
| Green: Bulk density (p.c.f.) | 189.4 | 188.5 | 188.4 |
| Cured: Bulk density (p.c.f.) | 185.9 | 183.5 | 182.9 |
| Burned: Bulk density (p.c.f.) | 184.7 | 182.2 | 181.7 |
| Apparent porosity (percent) | 16.89 | 18.17 | 18.35 |
| Modulus of rupture (p.s.i.): | | | |
| Room temperature | 2,087 | 1,739 | 1,540 |
| 2,700° | 1,463 | 1,353 | 1,144 |
| 2,800° | 1,140 | 824 | 1,061 |
| Hot crushing (p.s.i.): | | | |
| 2,800° | 2,481 | 2,888 | 2,882 |

The brick produced as described in Comparative Procedure C contained dicalcium silicate and merwinite as the principal accessory phases. An X-ray diffractogram showed approximately equal peaks for these two constituents. The brick of Comparative Procedure D showed a higher weight ratio of dicalcium silicate to merwinite than did those of Comparative Procedure C, while the brick of Comparative Procedure E showed a higher weight ratio of dicalcium silicate to merwinite than did the brick of Comparative Procedure D. It will be noted, however, that addition of hydrated lime, as in Comparative Procedures D and E, caused an increase in the apparent porosity of the brick. It will be appreciated, from the high temperature strength data, that the increase in porosity more than offset the increase in refractoriness of the accessory phases which resulted as a consequence of the increase in the weight ratio of dicalcium silicate to merwinite. Accordingly, adding hydrated lime to a brick batch is not an equivalent for dissolving calcium nitrate or the like in the tempering liquid, prior to the pressing of a shape from the tempered batch.

It will be appreciated that an improved method for preparing a magnesite refractory is provided by the instant invention. In general, the steps of the method include preparing a batch of size-graded periclase particles having lime and silica as the major impurities present in at least one accessory phase selected from the group consisting of forsterite, monticellite, merwinite, dicalcium silicate, brownmillerite, dicalcium ferrite, tricalcium silicate, free lime, the calcium aluminates such as $$3\ CaO \cdot Al_2O_3 \text{ and } 12\ CaO \cdot 7Al_2O_3$$

and combinations thereof, mixing therewith a sufficient amount of liquid to temper the mixture, forming the mixture into a shape, drying the shape and firing the shape. Lime and silica, in the batch, can vary widely, e.g., the weight ratio of the former to the latter can range from less than 1:1 to more than 3:1. The improvement according to the invention involves dissolving at least 0.1 percent of a calcium compound, calculated as CaO, and based on the dry weight of the batch, in the tempering liquid prior to the forming of a shape from the mixture thereof with the periclase particles. The amount of the calcium compound dissolved should be at least sufficient for chemical reaction with any free silica present in the batch, and the weight ratio of the total amount of calcium, expressed as CaO, to the total amount of silicon, expressed as $SiO_2$, should range from 1.5:1 to 2.6:1, preferably from 1.7:1 to 2.6:1. The time and temperature of firing and the weight ratio of lime to silica are all controlled so that there is a substantial increase in the over-all refractoriness of the accessory phases present in the fired refractory. Preferably, the amount of the calcium compound dissolved in the tempering liquid, as indicated, should range from 0.1 to 1.25 percent, on the indicated basis. Calcium nitrate and calcium chloride are the preferred calcium compounds, optimum results having been achieved with calcium nitrate. When calcium nitrate is used as the calcium compound dissolved in the tempering liquid prior to the pressing of a shape from the mixture thereof with the periclase particles, the invention also provides an improved method for producing a chemically bonded magnesite refractory.

As has been indicated above, the final step in producing a refractory by the improved method of the invention involves controlling the time and temperature of firing so that there is an increase in the refractoriness of the accessory phases. As shown by Example I, this increase in refractoriness can be a consequence of the substantially complete conversion of other accessory phases to dicalcium silicate. It is clear from the physical properties of the refractories produced by the method of Example I that optimum results are achieved in this way. Accordingly, to achieve the optimum benefit from the instant improvement, the lime to silica weight ratio should be controlled to from about 1.8:1 to about 2.2:1, and the time and temperature of firing should be controlled to effect substantially complete conversion of the accessory phases to dicalcium silicate. As is demonstrated in Example I, when the principal accessory phase is merwinite, this conversion can be accomplished by firing for five hours at 2900°. However, according to the procedure described in Example II, where there was a relatively minor amount of brownmillerite present as an accessory phase, firing for eight hours at 2900° did not effect a measurable conversion of brownmillerite to dicalcium silicate. Of course, in the Example II procedure, the overall ratio of lime to silica was substantially above that at which dicalcium silicate could be the only accessory phase. Accordingly, optimum strength properties could have been achieved in a refractory produced from the magnesite described in Example II by adjusting the lime to silica weight ratio to one from about 1.8:1 to about 2.2:1 and firing to cause substantially complete conversion of brownmillerite to dicalcium silicate; 8 hours at 2900° as described in Example II should be adequate. According to the Example II procedure, there was a substantial increase in the refractoriness of the accessory phases, as indicated by the improvement in high temperature properties by comparison with those achieved by Comparative Procedure B; accordingly, the overall refractoriness of the accessory phase can be increased according to the invention by the Example II firing procedure when the lime to silica weight ratio has been controlled so that such firing increases the amount of dicalcium silicate. Brownmillerite and MgO form a eutectic which melts at about 2440°: the dicalcium silicate melting point[7] is about 3270°. Accordingly, by the Example II procedure, the increased refractoriness was attributable to the increased amount of dicalcium silicate. The increase in refractoriness of the accessory phase, according to the Example I procedure, was attributable to the conversion of merwinite, melting point[7] about 2865°, to dicalcium silicate.

Where monticellite, melting point[8] about 2715°, is the accessory phase, the refractoriness thereof can be increased by conversion to merwinite; this can be accomplished by controlling the lime to silica weight ratio to about 1.5:1 and the time and temperature of firing to accomplish the conversion.

Although tricalcium silicate, melting point[9] about 3760°, is a highly refractory silicate, it is not preferentially formed as an accessory phase, to the exclusion of undesirable phases, in magnesites containing iron oxide and alumina, impurities which are usually present at significant levels in currently available magnesites. Instead, if the lime to silica weight ratio is sufficiently high to form tricalcium silicate, the excess lime, over that required to form dicalcium silicate, will occur first as dicalcium ferrite, as calcium aluminates, as brownmillerite, or the like, depending upon the specific proportions of the minor constituents of the accessory phase. Tricalcium silicate will form only with excess lime over that required to form these undesirable materials. Since dicalcium ferrite and the calcium aluminates all form eutectics with MgO which melt in the vicinity of 2450°, the overall refractoriness of the accessory phases can be increased substantially, when at least one of these constituents is present, either by controlling the time and temperature of firing and the lime to silica weight ratio so that the total amount of dicalcium silicate is increased (as in the Example II procedure), or to effect conversion thereof to dicalcium silicate (as in the Example I procedure).

[7] Of MgO eutectic.
[8] Of MgO eutectic.
[9] Of MgO eutectic.

It will be appreciated from the foregoing discussion that, in order to practice the improvement of the instant invention, the identity of the accessory phases should first be determined. This can conveniently be done by X-ray diffractograms, as discussed above, or by petrographic examination. If the increase in refractoriness attributable to the conversion of monticellite $$(CaO \cdot MgO \cdot SiO_2$$

lime to silica weight ratio 0.93:1) to merwinite $$(3CaO \cdot MgO \cdot 2SiO_2$$

lime to silica weight ratio 1.40:1) is desired, the lime to silica weight ratio can be controlled to about 1.5:1, and the conversion can be accomplished by firing for at least five hours at 2900°. If the conversion of merwinite, monticellite, or a combination of the two to dicalcium silicate, at least in part, is desired, a higher lime to silica weight ratio should be used, e.g. at least 1.7:1 and, most desirably, from 1.8:1 to 2.2:1 and, again, firing for at least five hours at 2900° is sufficient. On the other hand, if the magnesite starting material contains predominantly forsterite[10] ($2MgO \cdot SiO_2$, melting point about 3080°) adjusting the lime to silica weight ratio to about 1.5:1 and firing to convert the forsterite to merwinite would actually reduce the refractoriness of the accessory phase. Accordingly, if forsterite is the principal accessory phase, the lime to silica weight ratio should be adjusted, in practicing the improvement according to the invention, to form about 1.8:1 to about 2.2:1, and the time and temperature of firing should be controlled to effect substantial conversion of the forsterite to dicalcium silicate.

On the other hand, where the magnesite starting material contains dicalcium ferrite, calcium aluminates, or mixtures of the two, e.g., when the overall lime to silica weight ratio therein exceeds about 2.2:1, the accessory phase refractoriness can be increased either by controlling the lime to silica weight ratio to one lower than that of the magnesite grain, usually from about 2.2:1 to about 2.6:1 and firing to increase the proportion of dicalcium silicate, or by using the optimum lime to silica weight ratio and controlling the time and temperature of firing to accomplish substantial conversion of calcium aluminates, dicalcium ferrite and the like to dicalcium silicate.

The time and temperature requirements for increasing the refractoriness of the accessory phase can easily be determined experimentally for any given batch other than one of those identified above. All that is necessary is to prepare green shapes from the batch in question, including free silica if required to provide the required lime to silica ratio, after tempering with calcium nitrate or the like dissolved in the tempering liquid, and then to

[10] Forsterite can occur as the principal accessory phase at extremely low lime to silica weight ratios, e.g. in the vicinity of 0.3:1.

fire the shapes under different conditions of time and temperature. Usually, firing for five hours at 2900° and at 3000°, and for eight hours at 2900° and at 3000° will be sufficient. The increase in the refractoriness of the accessory phase can be measured empirically by determining the high temperature modulus of rupture and crushing strength of the refractories fired to each of the four conditions of time and temperature.

What I claim is:

1. In a method for preparing a magnesite refractory which includes the steps of (a) preparing a batch of size-graded periclase particles having lime and silica as the major impurities present in at least one accessory phase selected from the group consisting of forsterite, monticellite, merwinite, dicalcium silicate, brownmillerite, dicalcium ferrite, a calcium aluminate, tricalcium silicate, free lime, and combinations thereof,
(b) mixing therewith a sufficient amount of liquid to temper said mixture,
(c) forming said mixture into a shape,
(d) drying said shape, and
(e) firing said shape, the improvement wherein at least 0.1 percent of a calcium compound, calculated as CaO, and based on the dry weight of the batch, is dissolved in the tempering liquid prior to the forming of a shape from the mixture thereof with the periclase particles, the amount of the calcium compound being at least sufficient for chemical reaction with any free silica present in the batch, while maintaining the weight ratio of the total amount of calcium expressed as CaO to the total amount of silicon expressed as $SiO_2$, from 1.5:1 to 2.6:1, and controlling the time and temperature of firing and the lime to silica weight ratio so that there is a substantial increase in the over-all refractoriness of the accessory phases present in the fired refractory.

2. In a method as claimed in claim 1 the improvement wherein from 0.1 to 1.25 percent of a calcium compound, calculated as CaO and based upon the dry weight of the batch, is dissolved in the tempering liquid prior to the forming of a shape from the mixture thereof with the periclase particles, while maintaining the weight ratio of the total amount of calcium expressed as CaO to the total amount of silicon expressed as $SiO_2$, from 1.7:1 to 2.6:1.

3. In a method as claimed in claim 1 the improvement wherein the calcium compound is dissolved in the tempering liquid prior to the addition of the tempering liquid to the said mixture.

4. In a method as claimed in claim 1 the improvement wherein the calcium compound is selected from the group consisting of $Ca(NO_3)_2$ and $CaCl_2$.

5. In a method as claimed in claim 1 the improvement wherein the calcium compound is $Ca(NO_3)_2$, the weight ratio of the total amount of calcium expressed as CaO to the total amount of silicon expressed as $SiO_2$ is maintained from 1.8:1 to 2.2:1, and the time and temperature of firing are controlled so that there is a substantial conversion to dicalcium silicate of at least one other accessory phase present in the batch.

6. In a method for preparing a magnesite refractory which includes the steps of (a) preparing a batch of size-graded periclase particles having lime and silica as the major impurities present in at least one accessory phase selected from the group consisting of forsterite, monticellite, merwinite, dicalcium silicate, brownmillerite, dicalcium ferrite, a calcium aluminate, tricalcium silicate, free lime, and combinations thereof,
(b) mixing therewith a sufficient amount of liquid to temper said mixture,
(c) forming said mixture into a shape, and
(d) drying said shape, the improvement wherein at least 0.1 percent of calcium nitrate, calculated as CaO and based upon the dry weight of the batch, is dissolved in the tempering liquid prior to the forming of a shape from the mixture thereof with the periclase particles, the amount of the calcium nitrate being at least sufficient for chemical reaction with any free silica present in the batch, while maintaining the weight ratio of the total amount of calcium expressed as CaO to the total amount of silicon expressed as $SiO_2$, at one from 1.5:1 to 2.6:1 at which, upon firing, the over-all refractoriness of the accessory phases present in the refractory can be increased.

7. In a method as claimed in claim 6, the improvement wherein from 0.1 to 1.25 percent of calcium nitrate, calculated as CaO and based upon the dry weight of the batch, is dissolved in the tempering liquid prior to the forming of a shape from the mixture thereof with the periclase particles, while maintaining the weight ratio of the total amount of calcium expressed as CaO to the total amount of silicon expressed as $SiO_2$, from 1.7:1 to 2.6:1.

8. In a method as claimed in claim 6 the improvement wherein the calcium compound is dissolved in the tempering liquid prior to the addition of the tempering liquid to the mixture.

References Cited

UNITED STATES PATENTS

| | | | |
|---|---|---|---|
| 3,141,790 | 7/1964 | Davies et al. | 106—58 |
| 3,378,383 | 4/1968 | Van Dreser | 106—58 |
| 3,473,939 | 10/1969 | Mayberry et al. | 106—58 |
| 2,656,279 | 10/1953 | Heuer | 106—58 |
| 3,285,759 | 11/1966 | Crespi | 106—58 |

JAMES E. POER, Primary Examiner